United States Patent [19]

Purcell

[11] Patent Number: 5,015,506

[45] Date of Patent: May 14, 1991

[54] SURFACE PREPARATION FOR ADHESIVE BONDING

[75] Inventor: William M. Purcell, Springfield, Ohio

[73] Assignee: United States of America as Represented by the Secretary of the Air Force, Washington, D.C.

[21] Appl. No.: 578,387

[22] Filed: Sep. 7, 1990

[51] Int. Cl.$^5$ .............................................. C23C 22/00
[52] U.S. Cl. .................... 427/333; 427/387; 427/409; 427/410; 428/416; 428/450; 148/279
[58] Field of Search ...................... 427/333, 410, 387; 156/314, 326, 329, 331.8; 428/450, 416; 148/279

[56]  References Cited

U.S. PATENT DOCUMENTS 3,619,256  11/1971  Pepe et al. ......................... 428/450

Primary Examiner—Shrive Beck
Assistant Examiner—Cary A. Veith
Attorney, Agent, or Firm—Charles E. Bricker; Donald J. Singer

[57] ABSTRACT

A method for preparing an aluminum surface for adhesive bonding which consists essentially of the steps of:
  (a) preparing an aqueous solution of an epoxy-functional silane;
  (b) degreasing a selected area of the surface;
  (c) wet abrading the selected area using the aqueous epoxy silane solution;
  (d) removing any residue from the selected area;
  (e) allowing the surface to air dry;
  (f) wiping an alcoholic solution of an amino-functional silane onto the selected area; and
  (g) allowing the surface to air dry.

8 Claims, No Drawings

SURFACE PREPARATION FOR ADHESIVE BONDING

RIGHTS OF THE GOVERNMENT

The invention described herein may be manufactured and used by or for the Government of the United States for all governmental purposes without the payment of any royalty.

BACKGROUND OF THE INVENTION

The present invention relates to a method for preparing a surface for adhesive bonding, particularly an aluminum surface.

The integrity of adhesively bonded joints to aluminum substrates is very dependent upon preparation and priming of the aluminum surfaces to be joined. Acid etch techniques, such as FPL etch (sulphuric acid), chromic acid etch or Pasa Jel (phosphoric acid) etch, were used together with various primers to prepare aluminum surfaces for adhesive bonding. Recently, a phosphoric acid anodizing process has been developed which employs a phosphoric acid etch under an electrical potential to provide a stable oxide layer on the surface of aluminum substrates. Both tank and non-tank anodizing techniques have been developed. This process, when used together with corrosion-inhibiting primers, is generally considered to be the state of the art surface preparation for aluminum adhesive bonding.

Although the phosphoric acid anodizing process provides excellent surface preparation for adhesive bonding, the process has drawbacks. The process requires acid etching and the use of chromates in pretreatment and in primers. An electric potential similar to electroplating is required. Use of the process in a factory introduces problems with personnel safety and waste disposal. Use of the process in the field further introduces problems of corrosion, as when the acid is not properly and completely removed, and safety. Because of these problems, the non-tank technique is generally not used in field level maintenance.

The method generally used in field maintenance consists of dry abrading the surfaces to be joined, followed by adhesive bonding. This method does not provide a quality bond with acceptable durability.

Accordingly, it is an object of the present invention to provide a method for preparing an aluminum surface for adhesive bonding.

Other objects, aspects and advantages of the present invention will become apparent to those skilled in the art from a reading of the following detailed description of the invention.

SUMMARY OF THE INVENTION

In accordance with the present invention, there is provided a method for preparing an aluminum surface for adhesive bonding which consists essentially of the steps of:

(a) preparing an aqueous solution of an epoxy-functional silane;
(b) degreasing a selected area of the surface;
(c) wet abrading the selected area using the aqueous epoxy silane solution;
(d) removing any residue from the selected area;
(e) allowing the surface to air dry;
(f) wiping an alcoholic solution of an amino-functional silane onto the selected area; and
(g) allowing the surface to air dry.

The silanes employed in the present invention have the general formula:

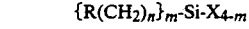

wherein m is an integer having a value of 1, 2 or 3; n is 0 or an integer having a value of 1, 2 or 3; R is an amino group, an alkylenediamino group having 1-4 carbon atoms such as ethylenediamino, propylenediamino, tetramethylenediamino, and hexamethylenediamino; an alkanolamino group of 1-4 carbon atoms such as diethanolamino, or mono- or di-propanolamino; an alkoxyl group having an epoxy group and containing 3-7 total carbon atoms such as glycidoxy or a cycloalkyl group having an epoxy group and containing 3-6 total carbon atoms such as epoxy-cyclohexyl; or an alkyl group having an epoxy group and containing 3-7 carbon atoms such as epoxybutyl; X is selected from the group consisting of hydroxyl group, an alkoxy group of 1-4 carbon atoms such as methoxy, ethoxy, propoxy, and butoxy; a lower alkoxy-alkoxy group of 2-8 carbon atoms such as methoxyethoxy, methoxypropoxy and methoxybutoxy; an alkyl group of 1-4 carbon atoms such as methyl, ethyl, propyl and butyl. A presently preferred epoxy-functional silane is gamma-glycidoxypropyltrimethoxy silane, available commercially as Z-6040 from Dow Corning Corporation, Midland, Mich., or as A-187 from Union Carbide Corporation, New York, N.Y. A presently preferred amino-functional silane is a mixture of phenyl trimethoxy silane (90-95%) and aminoethyl aminopropyl trimethoxy silane (5-10%), available commercially as Xl-6100 from Dow Corning Corporation.

The aqueous solution of epoxy-functional silane is prepared by mixing the silane with water at a concentration of about 0.5 to 2.5% (w/w), preferably about 1 w %. I have found that, for best results, the solution should be allowed to rest for at least 30 minutes, preferably about 1 hour before use. The alcoholic amino-functional silane solution is prepared by mixing the silane with a suitable lower aliphatic alcohol, such as methanol, ethanol, propanol, isopropanol or the like, at a concentration of about 15.0 to 35.0% (w/w), preferably about 25 w %.

The area to be adhesively bonded is degreased using a suitable solvent, such as trichloroethylene, 1,1,1-trichloroethane, toluene, acetone, ethanol, propanol, and the like. Degreasing may be accomplished by wiping the area with a clean cloth or pad wetted with the solvent. The metal surface may then be rinsed with fresh solvent, either the same or different, e.g., an acetone rinse following an initial cleaning with toluene, without wiping and the excess solvent allowed to evaporate.

Following the degreasing step, the metal surface is wet abraded using the previously described aqueous epoxy silane solution. The surface can be abraded using a nylon abrasive pad or a fine grit (e.g., 120-180 grit) sandpaper or emery cloth. It is important that the surface being abraded be continuously covered or contacted with the silane solution in order that newly exposed metal be immediately contacted with the silane, thus eliminating the opportunity for air oxidation or other contamination of the newly exposed metal.

Following the abrading step, any residue is wiped away using a clean, oil-free cloth or pad wetted with the aqueous silane solution. The abraded area is then allowed to air dry.

After the selected area has dried, the alcoholic solution of amino-functional silane is wiped onto the area using a clean, oil-free cloth or pad wetted with the alcoholic solution and the surface is allowed to air dry.

The thus-prepared area can be bonded to another substrate using any conventional bonding system, such as epoxy, silicone rubbers, urethane, and the like.

The method of this invention may be used for bonding a variety of substrates to alunimum. It is particularly useful for field level structural repairs.

Various modifications may be made to the invention as described without departing from the spirit of the invention or the scope of the appended claims.

I claim:

1. A method for preparing an aluminum surface for adhesive bonding which consists essentially of the sequential steps of:
   (a) preparing an aqueous solution of an epoxy-functional silane;
   (b) degreasing a selected area of the surface;
   (c) wet abrading the selected area using the aqueous epoxy silane solution;
   (d) removing any residue from the selected area;
   (e) allowing the surface to air dry;
   (f) wiping an alcoholic solution of an amino-functional silane onto the selected area; and
   (g) allowing the surface to air dry.

2. The method of claim 1 wherein the concentration of said aqueous solution is about 0.5 to 2.5% (w/w).

3. The method of claim 2 wherein the concentration of said aqueous solution is about 1 w %.

4. The method of claim 1 wherein the concentration of said alcoholic solution is about 15.0 to 35.0% (w/w).

5. The method of claim 4 wherein the concentration of said alcoholic solution is about 25 w %.

6. The method of claim 1 wherein said aqueous solution is allowed to rest about 30 minutes before use.

7. The method of claim 1 wherein said epoxy-functional silane is gamma-glycidoxypropyltrimethoxy silane.

8. The method of claim 1 wherein said amino-functional silane is a mixture of phenyl trimethoxy silane of about 90-95 wt %) and aminoethyl aminopropyl trimethoxy silane of about 5-10 wt %).

* * * * *